United States Patent [19]

Walsh

[11] Patent Number: 4,641,266
[45] Date of Patent: Feb. 3, 1987

[54] ACCESS-ARBITRATION SCHEME

[75] Inventor: Patrick M. Walsh, Chicago, Ill.

[73] Assignee: AT&T Bell Laboratories, Murray Hill, N.J.

[21] Appl. No.: 555,695

[22] Filed: Nov. 28, 1983

[51] Int. Cl.⁴ ........................................... G06F 13/24
[52] U.S. Cl. ................................................. 364/200
[58] Field of Search ... 364/200 MS File, 900 MS File; 340/825.5

[56] References Cited

U.S. PATENT DOCUMENTS

| | | | |
|---|---|---|---|
| 3,832,689 | 8/1974 | Means et al. | 340/147 |
| 4,106,104 | 8/1978 | Nitta et al. | 364/900 |
| 4,148,011 | 4/1979 | McLagan et al. | 364/900 X |
| 4,225,942 | 9/1980 | Kobs et al. | 364/900 |
| 4,257,095 | 3/1981 | Nadir | 364/200 |
| 4,281,381 | 7/1981 | Ahuja et al. | 364/200 |
| 4,375,639 | 3/1983 | Johnson, Jr. | 364/200 X |
| 4,384,323 | 5/1983 | Ahuja | 364/200 |
| 4,408,300 | 10/1983 | Shima | 364/900 |
| 4,488,218 | 12/1984 | Grimes | 364/200 |

OTHER PUBLICATIONS

P. Hughes et al., "Multi-Processor Systems", *Microelectronics and Reliability*, vol. 16, No. 4, 1977, pp. 281-293.

R. P. Lorétan, "Timing Problems in Electronic Lockout Chains" (presumed title), source and date unknown.
K. Mühlemann, "Arbiters, Priority Access Conflicts and the 'Glitch' Problem", *Microprocessors and Their Applications*, pp. 391-401 (1979).

*Primary Examiner*—Thomas M. Heckler
*Attorney, Agent, or Firm*—David Volejnicek

[57] ABSTRACT

In a processing system (10) that utilizes daisy-chain arbitration for controlling access to a shared resource (11,13) by a plurality of using devices (1-4,12), a using device (1-4) is allowed to issue an access request signal onto a request signal line (17) shared in common with the other using devices (1-4) only when it senses that the request line is idle. Sensing is done during one clock period and issuance of the request signal is done during the next clock period. The clock period exceeds the signal propagation delay across the request line. Receipt by the arbitrator (14) of a request signal is delayed by a clock period. Access grant signals are daisy-chained by a grant line (18) between the using devices (1-4), without synchronization at each device of issuance of the request signal and receipt of the grant signal, and without multiple sampling at each device of the grant signal. Following receipt of a grant signal, a using device ceases to issue its request signal only upon detecting the end of the grant signal.

23 Claims, 3 Drawing Figures

ACCESS-ARBITRATION SCHEME

TECHNICAL FIELD

This invention relates to processing systems, and in particular to shared resource access arbitration in such systems.

BACKGROUND OF THE INVENTION

In a processing system, a plurality of devices, such as processors and information input and output units, often share use of a common resource, for example a communication bus or a system memory. Only one of the devices can generally make use of the shared resource at any one time, and hence it is necessary to coordinate use of the shared resource between the using devices and to arbitrate between multiple requests to use the shared resource.

A common technique for arbitrating access to a resource is the daisy-chain arbitration scheme. In this scheme, whenever a using device wishes to access the shared resource, it issues an access request to an arbitrator. The arbitrator receives the access requests from the using devices and in response, whenever it finds the resource free for use by a device, it issues an access grant signal to the using devices. The using devices are connected in series, i.e., in a chain, by the grant signal line and the grant signal is daisy-chained through the using devices. When the grant signal is received by a device that does not have a request for access pending, the device merely passes the grant signal down the grant signal line to the next device in the chain. When the grant signal is received by a device that has a request for access pending, the device keeps, or blocks, the access grant signal—does not propagate it on to the next device in the chain. Then the device that kept the access grant signal accesses the resource and cancels its resource access request.

While the daisy-chain arbitration scheme as described is simple and effective, it does suffer from certain disadvantages. For example, the scheme gives priority of access to devices at the head of the chain over devices further along in the chain, and thus it is possible that one or more devices at the end of the chain will be locked out, prevented from accessing the shared resource, by frequent accesses made by the preceding devices in the chain. Thus certain devices may be effectively prevented from ever accessing the shared resource.

Furthermore, problems may arise when a device issues a request for access to the shared resource at substantially the same time that it receives an access grant signal intended for a requesting device further down the chain. This situation may result in glitches—oscillations of signal values—on the grant signal line such as will cause both the device under consideration as well as the subsequent device in the chain to receive a grant signal, resulting in both devices attempting to access the resource simultaneously. Prior art attempts at solving this problem, such as synchronizing the issuance of access requests with receipt of access grant signals at each using device to ensure that they do not occur simultaneously, or sampling the access grant line multiple times at each device to ensure that a grant signal has truly been received, introduce too much additional circuitry and time delay into the arbitration scheme and thereby adversely affect system cost and performance.

SUMMARY OF THE INVENTION

It is these and other disadvantages of the prior art that the invention is directed to solving.

According to the invention, in a daisy-chain scheme of arbitrating access to a shared resource by a plurality of users, a user is prevented from issuing a resource access request to the arbitrator while another user has a request for resource access pending with the arbitrator. Furthermore, a user that has a request for resource access pending with the arbitrator is preferably immediately allowed to access the resource upon detecting a grant of resource access; synchronization of receipt of the grant or multiple sampling of the grant is not required.

Preferably, monitoring of whether another user has a request for resource access pending continues until no requests are pending, followed by issuance of a resource access request to the arbitrator at a subsequent time to give all devices time to determine that no requests are pending. In addition, a delay is introduced between issuance of a resource access request to the arbitrator and issuance of a grant of resource access by the arbitrator. Furthermore, a user that is issuing a resource access request to the arbitrator and receives a resource access grant from the arbitrator continues to issue the resource access request while it continues to detect the resource access grant.

Advantageously, the inventive scheme prevents lockout of any device from accessing the shared resource. The invention ensures that every device will have an opportunity to access the shared resource, and that it will have the opportunity substantially as often as any other device in the chain. Yet the inventive scheme accomplishes this result without changing the static priority of access to the resource that is established by the devices' relative positions in the chain. The inventive scheme also solves the above-described glitch problem without introducing delay into the propagation of the grant signal at each using device and without adding circuitry at each using device to accomplish this result. Hence the scheme improves the speed and efficiency of operation of the processing system that uses it, yet does so with less circuitry and hence at lower cost than the prior art schemes.

These and other advantages and features of the present invention will become apparent from the following description of an illustrative embodiment of the invention, taken together with the drawing.

DETAILED DESCRIPTION

Figure 1:
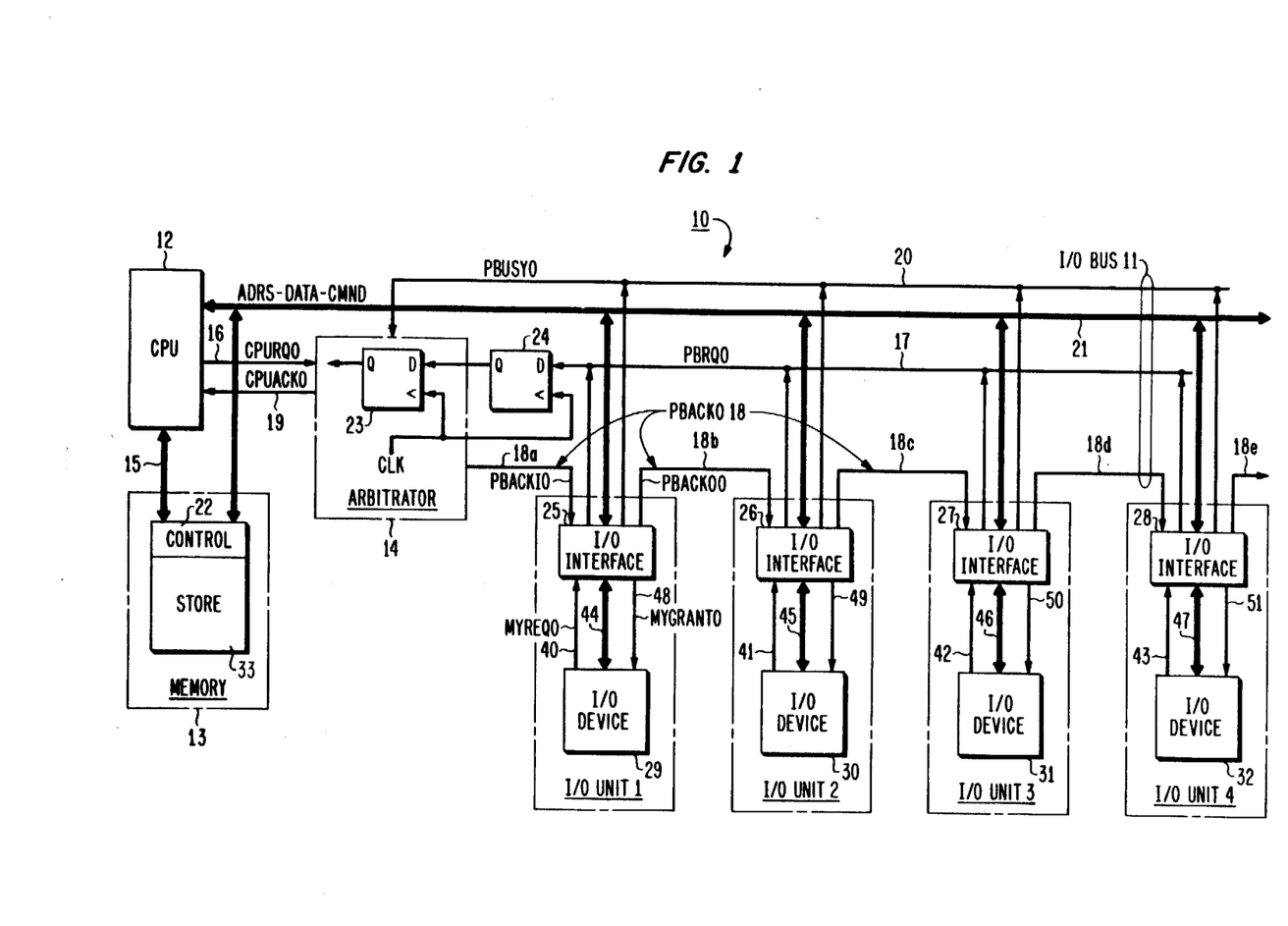
FIG. 1 is a block diagram of an illustrative processing system embodying the invention.

Turning now to the drawing, FIG. 1 shows a data processing system designated generally by the numeral 10. The system 10 comprises a plurality of input and output (I/O) units 1–4, a central processing unit (CPU) 12, and a system memory 13, interconnected by an I/O bus 11 under control of an arbitrator 14.

The memory 13 stores information such as data, for use by other units of the system 10. The memory 13 is a conventional passive device, generally made up of a store 33 which is the actual storage area of the memory 13, and a controller 22 which administers the store 33, performing the reading and writing functions within the store 33, and carries on communications between the memory 13 and other parts of the system 10.

The CPU 12 is any conventional and suitable processor. It is the center of intelligence of the system 10, performing computational and logical functions, and executing system tasks with the aid of other parts of the system 10.

The CPU 12 has a private connection to the memory 13 via memory bus 15. The bus 15 may be any conventional bus having address, data, and control lines suitable for communications between a memory and a processor.

The CPU 12 is likewise coupled to the I/O bus 11, as are a plurality of I/O units 1–4. While for illustrative purposes four I/O units are shown in FIG. 1, the number may vary depending upon the present needs of the application to which the system 10 is put.

Each I/O unit 1–4 includes an I/O device 29–32, respectively. The I/O devices 29–32 may be any desired peripheral devices, such as communication links, data input and display terminals, printers, or disk and tape storage devices.

The I/O devices 29–32 are interfaced for communication to the I/O bus 11 by I/O interfaces 25–28, respectively. The I/O interfaces 25–28 perform substantially conventional functions, such as signal level and protocol conversions between the I/O devices 29–32 and the I/O bus 11, and other functions to permit the I/O devices 29–32 to communicate with the rest of the system 10 over the I/O bus 11. I/O interfaces of this general type are well known to the art.

The I/O devices 29–32 are coupled to their respective I/O interfaces 25–28 by communication buses or links that include MYREQ0 signal lines 40–43, respectively, MYGRANT0 signal lines 48–51, respectively, and other suitable connections 44–47, respectively, such as data and control lines. An I/O device desirous of communicating on the I/O bus 11 asserts low its MYREQ0 line leading to the associated I/O interface. In response, when the I/O interface determines that the associated I/O device may communicate on the I/O bus 11, it asserts low the MYRGANT0 line leading to the I/O device thereby allowing the I/O device to access the I/O bus 11.

The I/O interfaces 25–28 of the I/O units 1–4 are coupled to the various signal lines of the I/O bus 11. The I/O bus 11 includes various address, data, command, and other signal lines (ADRS-DATA-CMND) collectively designated by the numeral 21, and the I/O interfaces 25–28 connect to these lines 21 in parallel. For indicating the busy or idle status of the I/O bus 11, the I/O bus 11 includes a bus busy (PBUSY0) signal line 20. The I/O interfaces 25–28 also connect to the line 20 in parallel. The CPU 12 uses other signal lines, for example address and data strobe lines (not shown) to indicate to the arbitrator 14 whether it is using the I/O bus 11 or the memory 13.

For controlling access to the I/O bus 11, the I/O bus 11 includes an access request (PBRQ0) signal line 17 and an access grant (PBACK0) signal line 18. The I/O units 1–4 share use of the access request line 17 and the I/O interfaces 25–28 are coupled in parallel to the access request line 17. The I/O units 1–4 likewise share use of the access grant line 18. The I/O interfaces 25–28 of the I/O units 1–4 are coupled in a serial chain by portions 18a–18e of the grant line 18. At each I/O interface, the incoming portion of the grant line 18 is designated as PBACKI0, and the outgoing portion of the grant line 18 is designated as PBACKO0. Portions 18b–18d of the line 18 extend between the I/O interfaces 25–28 respectively. Since the I/O unit 4 is the last unit in the serial chain, portion 18e of the grant line 18 that extends from the I/O interface 28 is not connected to any other I/O interface.

The signal lines of the I/O bus 11, as well as other signal lines of the system 10 that are discussed herein, are considered to be asserted, or active, when they are in the logical low, or zero, state.

Control of access to the I/O bus 11 and to the memory 13 between the I/O units 1–4 and the CPU 12 is handled by the arbitrator 14. The arbitrator 14 is coupled to I/O interfaces 25–28 of the I/O units 1–4 by the access request line 17 and the access grant line 18 of the I/O bus 11. Portion 18a of the access grant line 18 chains the arbitrator 14 to the first I/O unit 1 in the I/O unit chain. The CPU 12 has private connections to the arbitrator 14 via CPU access request (CPURQ0) signal line 16 and CPU access acknowledge (CPUACK0) signal line 19.

The arbitrator 14 is a conventional device well known in the art. The arbitrator 14 receives requests for access to the I/O bus 11 and/or to the memory 13 from the I/O units 1–4 and the CPU 12. The request lines 17 and 16 convey the request signal from the I/O units 1–4 and the CPU 12, respectively to the arbitrator 14. In response to access requests, the arbitrator 14 monitors the bus busy line 20, and when it detects that the I/O bus 11 and/or the memory 13 is free to be accessed by a device, it issues a grant of access across the appropriate one of the grant lines 18 and 19. The grant lines 18 and 19 convey the grant signals to the I/O units 1–4 and to the CPU 12, respectively.

The CPU may access either the memory 13 or the I/O units 1–4. The CPU 12 issues an access request signal on the request line 16 whenever it wishes to access either the memory 13 across the memory bus 15 or any of the I/O units 1–4 across the I/O bus 11. In this example, the I/O units 1–4 may access the memory 13 only; they may not access each other or the CPU 12. An I/O unit 1–4 issues an access request signal on the request line 17 when it wishes to access the memory 13 across the I/O bus 11. Thus the arbitrator 14 can be seen to be arbitrating accesses to both the memory 13 and the I/O bus 11. Both the memory 13 and the I/O bus 11 are shared resources.

In response to assertion of the MYREQ0 line by the subtending I/O device, an I/O interface is allowed to assert the access request line 17 only when it senses that the request line 17 is not asserted by any other I/O interface. In other words, an I/O unit is allowed to issue an access request signal to the arbitrator 14 only when the request line 17 is idle, meaning that no other I/O unit has an access request pending with the arbitrator 14. An I/O unit is prevented from issuing an access request signal on the request line 17 when another I/O unit already has a request signal issued thereon. This condition effectively eliminates the lockout problem, because an I/O unit's pending access request cannot be preempted by a later access request of an I/O unit of higher priority, i.e., one positioned closer to the arbitrator 14 in the grant daisy-chain. This condition also reduces the glitch problem, as it eliminates the possibility that an I/O interface will receive a grant signal intended for a different I/O unit at the same time that the I/O interface is in the process of asserting the access request line 17.

Though an I/O unit is allowed to issue an access request signal to the arbitrator 14 only when the request line 17 is idle, it is possible for a plurality of I/O units to assert the request line 17 substantially simultaneously. In such a case there are a plurality of access requests pending on the line 17 simultaneously. This presents no problem. I/O units that have simultaneously pending access requests gain access to the I/O bus sequentially, according to their order of priority established by their order in the grant signal line daisy-chain, as in a conventional daisy-chain arbitration scheme. An I/O unit that has received an access grant signal merely removes its access request from the request line 17 at a designated time. The arbitrator 14 then processes the remaining pending requests of other I/O units, until all pending requests have been satisfied and the request line 17 is once again idled.

To make sure that all I/O units 1–4 have a substantially equal chance of asserting the request line 17 after the request line 17 becomes idle, the I/O units 1–4 must sample the status of the request line 17 during one time period and may begin to assert the line 17 only during a second time period that is subsequent to the one time period. The I/O units 1–4 in this example operate asynchronously and hence the time periods generally do not begin and end at the same instant for each I/O unit. However, the time periods preferably do have the same duration in each I/O unit, and preferably the duration of the time periods is at least as long as the end-to-end signal transit delay of the request line 17. The time periods in each I/O unit are measured by that I/O unit's clock. The implementation of this scheme is discussed further below in conjunction with FIG. 2.

To further reduce the possibility of occurrence of a glitch, one that could result from assertion by an I/O interface of the request line 17 and substantially simultaneous detection by the I/O interface of an incoming grant signal issued by the arbitrator 14 in response thereto, generation of the grant signal by the arbitrator 14 is delayed for some period of time from appearance at the arbitrator 14 of the request signal. This is accomplished in the system of FIG. 1 by coupling the request line 17 to the input of the arbitrator 14 via a flip-flop 24. As shown in FIG. 1, the conventional arbitrator 14 already has at its input a flip-flop 23, which is for example a conventional D-type flip-flop, for sampling and latching the state of the access request line 17. The flip-flop 24 is likewise a conventional D-type flip-flop. The D signal input of the flip-flop 24 is connected to the access request line 17. The Q signal output of the flip-flop 24 is connected to the D signal input of the flip-flop 23. Clock inputs of both flip-flops 23 and 24 are connected to a common source of clock (CLK) signals. Hence the flip-flop 24 causes a delay of one clock period between the receipt of an access request signal on the line 17 and the receipt of that signal at the input of the arbitrator 14. Thereby the flip-flop 24 guarantees a delay of at least one clock period between assertion of the request line 17 and assertion of the grant line 18.

Finally, to completely eliminate the possibility of occurrence of a glitch, one that could result from too early a deassertion by an I/O interface of the request line 17 following receipt by that I/O interface of a grant signal on the grant line 18, an I/O interface delays deassertion of the request line 17 until it detects deassertion of the incoming portion of the grant line 18. The implementation of this scheme is likewise discussed further below in conjunction with FIG. 2.

Figure 2:
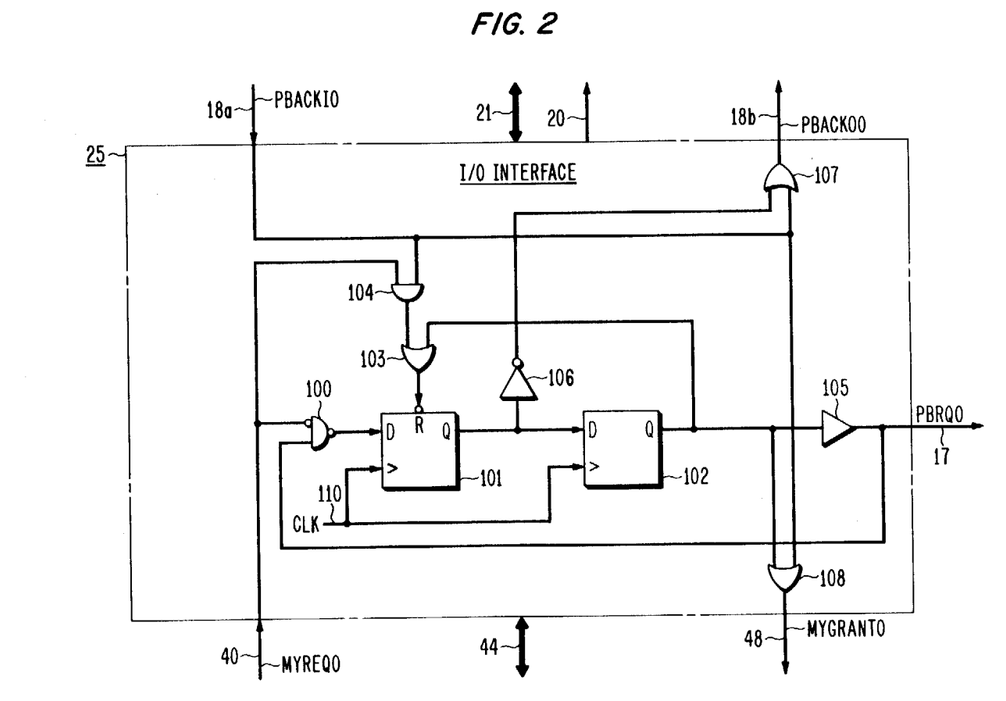
FIG. 2 is a circuit diagram of a portion of an input and output interface of FIG. 1.

Turning now to FIG. 2, there is shown the interface circuitry involved in processing access requests and access grants of a representative I/O interface. For purposes of illustration, FIG. 2 shows the access request and grant processing circuitry of the I/O interface 25 of the I/O unit 1. It will be understood that the respective circuitry of the I/O interfaces of other I/O units is equivalent.

As shown in FIG. 2, the MYREQ0 line 40 leading from the I/O device 29 connects to an inverter input of a NAND gate 100. A second, noninverting, input of the NAND gate 100 is connected to the access request line 17. Thus the output of the NAND gate 100 is asserted, or at logic level zero, only when the MYREQ0 line 40 is asserted and the access request line 17 is not asserted.

The output of the NAND gate 100 is connected to the D signal input of a conventional D-type flip-flop 101. The Q output of the flip-flop 101 is connected to the D signal input of a second D-type flip-flop 102. The Q output of the flip-flop 102 is in turn connected, through a line driver 105, to the access request line 17. The clock inputs of both flip-flops 101 and 102 connect to a CLK line 110 which in turn connects to a source of clock signals, for example to a clock (not shown) of the I/O unit 1. The source of clock signals of an I/O unit need not operate at the same frequency as the clock of the arbitrator 14. The serial connection of the flip-flops 101 and 102 provides the requisite one clock pulse delay between sampling of the request line 17 and assertion of the request line 17 by the I/O interface 25.

The flip-flops 101 and 102 provide the requisite delay in the following manner. Assuming that the MYREQ0 line 40 is asserted, the output of the NAND gate 100 represents the inverted state of the access request line 17. Hence a clock signal input to the flip-flop 101 and 102 cause the flip-flop 101 to "sample" the state of the request line 17. If the request line 17 is asserted, the Q output of the flip-flop 101 is high, indicating to the flip-flop 102 that the request line 17 may not be asserted in the next clock period. If the request line 17 becomes idle, the Q output of the flip-flop 101 goes low, telling the flip-flop 102 to assert the request line 17 on the next clock pulse. Arrival of this next clock signal input to the flip-flops 101 and 102 causes the flip-flop 102 to respond to the "assert" directive of the flip-flop 101 by asserting the request line 17 regardless of the current state of the request line 17.

The Q output of the flip-flop 102 is also connected to the input of an OR gate 103. The other input of the OR gate 103 is connected to the output of an AND gate 104 whose inputs connect to the MYREQ0 line 40 and the access grant line 18a. The output of the OR gate 103 is connected to the reset (R) input of the flip-flop 101. Because MYREQ0 line 40 has to be asserted, or low, in order for the Q output of the flip-flop 102 to be low, during normal operation the output of the AND gate 104 will be low when the Q output of the flip-flop 102 goes low and therefore the output of the OR gate 103 will likewise go low. Hence assertion of the request line 17 by the flip-flop 102 causes the flip-flop 101 to be reset. When reset, the flip-flop 101 latches a low signal at its Q output and ceases to respond to signal levels at its D input. The flip-flop 101 remains reset until a high level output of the AND gate 104 enables it to again sample its D signal input.

The Q output of the flip-flop 101 is also connected through an inverter 106 to an input of an OR gate 107. The other input of the OR gate 107 is connected to the portion 18a of the access grant line 18 incoming from the arbitrator 14, and the output of the OR gate 107 is connected to the portion 18b of the access grant line 18 outgoing to the I/O unit 2. While the flip-flop 101 is indicating that the request line 17 should not be asserted by the I/O unit 1, the input to the OR gate 107 from the inverter 106 is low and hence the OR gate 107 allows grant signals incoming from the arbitrator 14 to pass on to the I/O unit 2. However, when the flip-flop 101 indicates that the request line 17 should be asserted by the I/O unit 1, the input to the OR gate 107 from the inverter 106 is high and the OR gate 107 blocks grant signals incoming on the line 18a. The OR gate 107 outputs a high signal on the outgoing grant line 18b and prevents low signals appearing on the line 18a from propagating to the I/O unit 2.

The incoming portion 18a of the grant line 18 is also connected to an input of an OR gate 108. A second input of the OR gate 108 is connected to the Q output of the flip-flop 102. The output of the OR gate 108 is connected to MYGRANT0 line 48. When the flip-flop 102 is not asserting the request line 17, the OR gate 108 blocks grant signals from propagating onto the MYGRANT0 line 48. But when the flip-flop 102 asserts the request line 17, the OR gate 108 channels a grant signal incoming on the portion 18a of the grant line 18 onto the MYGRANT0 line 48. The MYGRANT0 line 48 conducts the grant signal to the I/O device 29 to indicate to the I/O device 29 that it is free to access the I/O bus 11.

As the above discussion and FIG. 2 indicate, the OR gate 107 is open to the passage of grant signals when the OR gate 108 is closed, and vice versa. Thus a grant signal incoming on the portion 18a of the grant line 18 is channeled either to the outgoing portion 18b of the grant line 18 or to the MYGRANT0 line 48. Though, in this example, change of state (from being open to being closed to the passage of grant signals, and vice versa) of the OR gate 108 is delayed by one clock period from the change of state of the OR gate 107, a grant signal will not arrive at the gates 107 and 108 while they are changing state.

When the I/O device 29 receives a grant signal on MYGRANT0 line 48, it responds by asserting the PBUSY0 line 20 to indicate that it is accessing the I/O bus 11, and by deasserting the MYREQ0 line 40. The deassertion of the MYREQ0 line 40 raises to a high logic level one of the inputs of the AND gate 104, but the output of the AND gate 104 remains low for the duration of the grant signal on the portion 18a of the grant line 18. Only when the grant signal comes to an end does the output of the AND gate 104 go high, sending high the output of the OR gate 103, and thus reenabling the flip-flop 101 to sample its D signal input and to direct the flip-flop 102 to deassert the request line 17. Thus the I/O interface 25 continues to assert the request line 17 for the duration of the grant signal, thereby preventing the OR gates 107 and 108 from changing their state during the grant signal.

Figure 3:
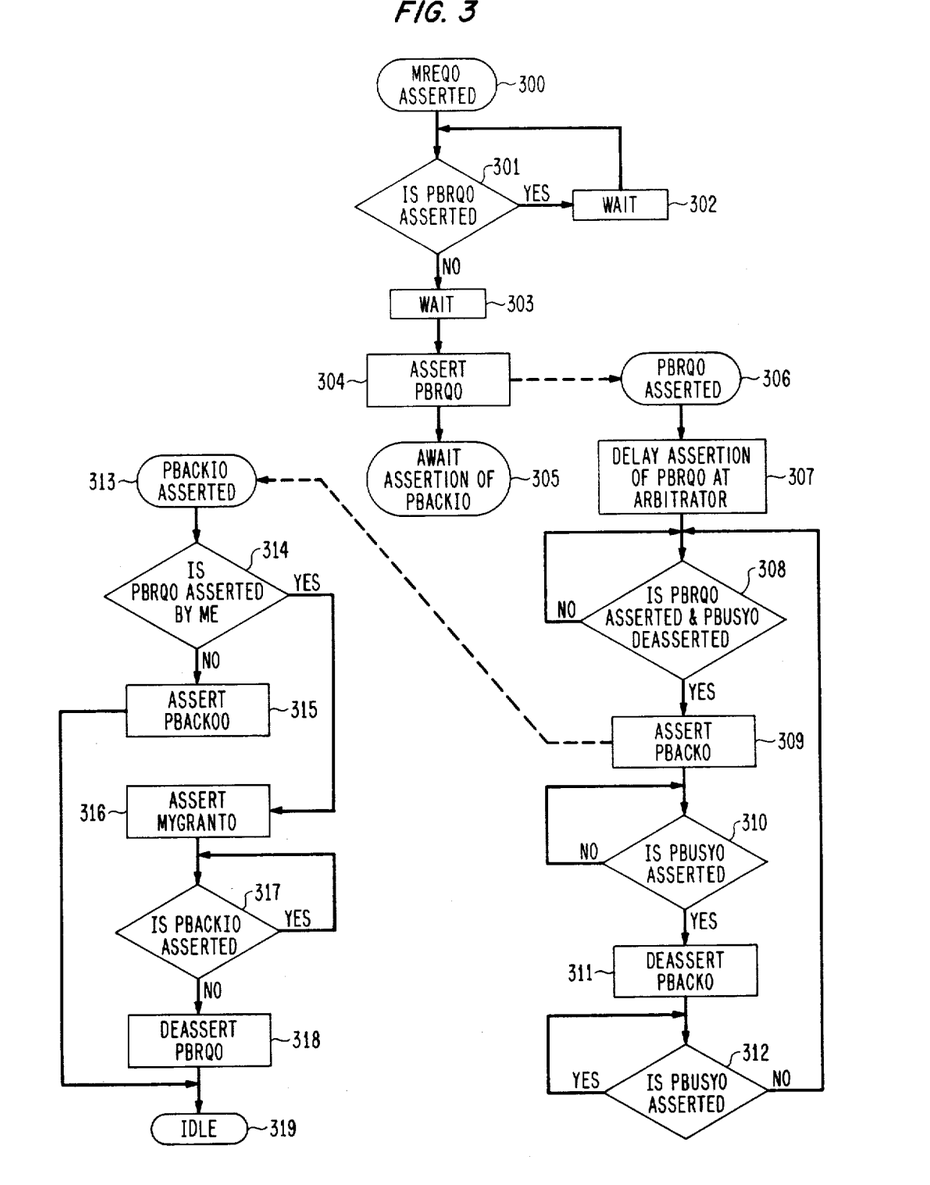
FIG. 3 is a logic flow diagram of the access arbitration operation of the system of FIG. 1 in arbitrating between I/O units.

To illustrate the access arbitration operation of the system of FIG. 1 in arbitrating between the plurality of I/O units 1-4, attention is directed to the logic flow diagram of FIG. 3. FIG. 3 represents the progression of steps taken by an I/O interface 25-28 and the arbitrator 14, in conjunction with the flip-flop 24, in arbitrating access by an I/O unit 1-4 to the I/O bus 11 and hence to the memory 13.

When activated by the subtending I/O device's request for access of the I/O bus 11 and the memory 13, signaled by assertion of the MYREQ0 line, at the block 300, an I/O interface samples the resource access request (PBRQ0) line 17 to determined whether the line 17 is asserted, at the block 301. If line 17 is asserted, the I/O interface waits for a clock period, at the block 302, and then checks the line 17 again at the block 301. The I/O interface periodically samples the line 17, at the blocks 301 and 302, until it finds the line 17 idle. Upon finding the line 17 idle, the I/O interface waits until the next clock period, at the block 303, and then asserts the line 17, at the block 304. The I/O interface then monitors the incoming portion (PBACKI0) of the resource access grant line 18 and awaits assertion thereof, at the block 305.

Assertion of the request line 17 by one or more I/O interfaces, at the block 304, activates the flip-flop 24, at the block 306, and the flip-flop 24 delays for a clock period the access request signal, at the block 307, before presenting it to the arbitrator 14.

The arbitrator 14 monitors the request line 17 and the bus busy (PBUSY0) line 20 to determine if a resource request access signal is pending and to determine the busy status of the I/O bus 11 or the memory 13, at the block 308. Upon detecting assertion of the request line 17 while the bus busy line 20 is idle, the arbitrator 14 asserts the portion 18a of the resource access grant (PBACK0) line 18, at the block 309. The arbitrator 14 then waits for the proper I/O unit to accept the access grant and subsequently to assert the PBUSY0 line 20, at the block 310. When it detects assertion of the bus busy line 20, the arbitrator 14 deasserts the grant line 18, at the block 311. The arbitrator 14 then monitors the bus busy line 20, at the block 312, awaiting deassertion thereof by the I/O unit upon completion of its I/O bus 11 access. When it finds that the bus busy line 20 has been deasserted, the arbitrator 14 returns to monitoring the access request line 17 together with the bus busy line 20, at the block 308.

The grant signal generated by the arbitrator 14 at the block 309 propagates on the grant line 18 to an I/O interface. When it detects the incoming portion (PBACKI0) of the grant line 18 asserted, at the block 313, an I/O interface takes one of two courses of action, at the block 314. If the I/O interface is not asserting the request line 17, it allows assertion of the incoming portion of the grant line 18 to propagate to the outgoing portion (PBACKO0) of the grant time 18, thus in effect asserting the PBACKO0 line, at the block 315. The I/O unit then returns to its previous, idle, condition, at block 319. If, however, the I/O interface is asserting the request line 17 at the block 314, it allows assertion of the incoming portion of the grant line 18 to immediately propagate onto the MYGRANT0 line, thus in effect immediately asserting the MYGRANT0 line, at the block 316. Even though the subtending I/O device may immediately deassert the MYREQ0 line in response to assertion of the MYGRANTO line, the I/O interface monitors the incoming portion of the grant line 18, at the block 317, and continues to issue the request signal on the line 17 while it continues to detect the grant signal of the grant line 18. The I/O interface deasserts the request line 17, at the block 318, only when it senses the termination of the grant signal, i.e., only when it detects that the incoming portion of the grant line 18 has been deasserted. The I/O unit then returns to the idle condition, as far as access arbitration is concerned, at the block 319. While it is in the idle condition, the I/O unit may be performing various actions in interfacing the subtending I/O device to the I/O bus 11 and memory 13.

Of course, various changes and modifications to the illustrative embodiment described above will be apparent to those skilled in the art. For example, the shared resource may be a device other than a bus or a memory, for example a processor or an I/O device. The using units may be devices other than I/O units, such as other processors. The resource access request and grant signals may be interrupts and interrupt acknowledgements. A plurality of access request lines may be utilized: for example, each using unit may have a request line dedicated to its own use. The various signal lines may be asserted high instead of low. Or the I/O interface circuitry may be implemented either with a logic gate array or with a microprocessor instead of with discrete components. Such changes and modifications can be made without departing from the spirit and the scope of the invention and without diminishing its attendant advantages. It is therefore intended that such changes and modifications be covered by the following claims.

What is claimed is:

1. A processing system comprising:
a plurality of resource users;
a resource shared by the plurality of users;
an arbitrator for controlling access by the plurality of users to the resource;
first means coupling the plurality of users to the arbitrator for conveying requests for resource access from the plurality of users to the arbitrator;
second means coupling the arbitrator and the plurality of users in a chain for conveying grants of resource access from the arbitrator to the users;
means associated with each user and coupled to the first conveying means for preventing the associated user from issuing a request for resource access on the first conveying means, while another user has a request for resource access pending with the arbitrator; and
means associated with each user and cooperative with the second conveying means for causing the associated user to continue issuing its issued request for resource access on the first conveying means until termination of receipt at the associated user of a grant of resource access on the second conveying means.

2. The system of claim 1 further comprising:
means associated with each user and coupled to the second conveying means for immediately allowing the user to access the resource upon detecting a grant of resource access on the second conveying means, while the user has a request for resource access pending with the arbitrator.

3. The system of claim 2 further comprising:
means cooperative with the arbitrator for introducing a delay between issuance of a request for resource access on the first conveying means and issuance of a grant of resource access by the arbitrator on the second conveying means.

4. The system of claim 1 wherein the preventing means comprise:
means for monitoring the first conveying means at a first time to determine whether another user has a request for resource access issued on the first conveying means; and
means responsive to the monitoring means for issuing on the first conveying means at a second time delayed from the first time a request for resource access, when the monitoring means have determined that no other user has a request for resource access issued on the first conveying means and the user is requesting resource access.

5. The system of claim 4 further comprising:
means associated with each user and coupled to the second conveying means for immediately allowing the user to access the resource upon detecting a grant or resource access on the second conveying means while the issuing means are issuing a request for resource access on the first conveying means; and wherein the causing means comprise:
means associated with each user for causing the issuing means to continue issuing the request for resource access while the grant of resource access detected by the means for allowing the user to access the resource continues to be detected.

6. The system of claim 5 further comprising:
means cooperative with the first conveying means and with the arbitrator for delaying receipt by the arbitrator of requests for resource access conveyed by the first conveying means.

7. A processing system comprising:
a plurality of shared resource users;
a resource shared by the plurality of users;
a resource access request signal line shared by the plurality of users;
a resource access grant signal line daisy-chained between the plurality of users;
an arbitrator for monitoring the busy status of the shared resource, the arbitrator coupled to the request line for receiving resource access request signals thereon, and coupled to the grant line for transmitting a resource access grant signal thereon when it receives a resource access request signal and detects that the shared resource is not busy;
first circuit means associated with each user and responsive to user requests for resource access for monitoring the request line at a first time to determine whether the request line is idle;
second circuit means associated with each user and responsive to the first circuit means at a subsequent second time for issuing a resource access request signal on the request line when the request line has been determined to be idle and the user is requesting resource access;
third circuit means associated with each user, coupled to the grant line, and responsive to the second circuit means, for immediately allowing the associated user to access the resource in response to detecting a resource access grant signal incoming on the grant line while a resource access request signal is issued on the request line by the associated second circuit means; and
fourth circuit means associated with each user, coupled to the grant line, and cooperative with the third circuit means, for preventing a resource access grant signal responded to by the third circuit means from being conducted to subsequent users in the chain.

8. The processing system of claim 7 further comprising:
 fifth circuit means coupling the arbitrator to the request line for delaying receipt by the arbitrator of resource access request signals; and
 sixth means associated with each user and cooperative with the second circuit means for forcing the second circuit means to continue issuing the resource access request signal on the request line until termination of detection at the associated user of the resource access grant signal responded to by the third circuit means.

9. A resource using unit for a processing system that includes a plurality of resource using units, a resource shared by the plurality of using units, an arbitrator for controlling access by the plurality of using units to the resource, at least one request conductor coupling the plurality of using units to the arbitrator for conveying resource access request signals from the plurality of using units to the arbitrator, and a grant conductor coupling the arbitrator and the plurality of using units in a chain for conveying resource access grant signals from the arbitrator to the using units, the using unit comprising:
 a resource user;
 means for monitoring the at least one request conductor and for preventing the associated resource user from issuing a resource access request signal on a request conductor while it detects that another user has a resource access request signal issued on a request conductor; and
 means for monitoring the grant conductor and for causing the user to continue issuing its issued resource access request signal on a request conductor while it detects a resource access grant signal on the grant conductor.

10. The using unit of claim 9 further comprising:
 means for monitoring the grant conductor and for immediately allowing the user to access the resource upon detecting a resource access grant signal on the grant conductor while the user has a resource access request signal issued on a request conductor.

11. The using unit of claim 9 wherein the preventing means comprise:
 means for monitoring the at least one request conductor at a first time to determine whether another user has a resource access request signal issued on a request conductor; and
 means responsive to the monitoring means for issuing on a request conductor at a second time delayed from the first time a resource access request signal, when the monitoring means have determined that no other user has a resource access request signal issued on a request conductor and the user is requesting resource access.

12. The using unit of claim 11 further comprising:
 means for monitoring the grant conductor and for immediately allowing the user to access the resource upon detecting a resource access grant signal on the grant conductor while the issuing means are issuing a resource access request signal; and wherein the causing means comprise:
 means for causing the issuing means to continue issuing the resource access request signal while the resource access grant signal detected by the means for allowing the user to access the resource continues to be detected.

13. A resource using unit for a processing system that includes a plurality of resource using units, a resource shared by the plurality of using units, a resource access request signal line shared by the plurality of using units, a resource access grant signal line daisy-chained between the plurality of using units, and an arbitrator for monitoring the busy status of the shared resource, the arbitrator coupled to the request line for receiving resource access request signals thereon, and coupled to the grant line for transmitting a resource access grant signal thereon after receiving a resource access request signal and detecting that the shared resource is not busy, the using unit comprising:
 a resource user;
 first circuit means responsive to user requests for resource access for monitoring the request line at a first time to determine whether the request line is idle;
 second circuit means responsive to the first circuit means at a subsequent second time for issuing a resource access request signal on the request line when the request line has been determined to be idle and the user is requesting resource access;
 third circuit means for monitoring the grant line and responsive to the second circuit means for immediately allowing the user to access the resource in response to detecting a resource access grant signal incoming on the grant line while a resource access request signal is issued on the request line by the second circuit means; and
 fourth circuit means for monitoring the grant line and cooperative with the third circuit means for blocking at the using unit resource access grant signals responded to by the third circuit means from propagating to other using units.

14. The using unit of claim 13 further comprising:
 fifth means cooperature with the second circuit means for forcing the second circuit means to continue issuing the resource access request signal until termination of detection at the using unit of the resource access grant signal responded to by the third circuit means.

15. Apparatus for interfacing a resource user to a resource in a processing system that includes a plurality of resource users, a resource shared by the plurality of users, an arbitrator for controlling access by the plurality of users to the resource, at least one request conductor coupling the plurality of using units to the arbitrator for conveying user resource access request signals to the arbitrator, and a grant conductor coupling the arbitrator and the plurality of users in a chain for conveying user resource access grant signals from the arbitrator, the apparatus comprising:
 means for receiving a request for resource access from the associated user;
 means responsive to the receiving means for monitoring the at least one request conductor and for commencing to issue a resource access request signal on a request conductor only when it detects that no that user has a resource access request signal issued on a request conductor; and
 means for monitoring the grant conductor and for causing the means for commencing to issue a resource access request signal to continue issuing its issued signal on a request conductor while the causing means detect a resource access grant signal on the grant conductor.

16. The apparatus of claim 15 further comprising:

means for monitoring the grant conductor and for immediately allowing the associated user to access the resource upon detecting a resource access grant signal on the grant conductor while the means for commencing to issue a resource access request signal are issuing a resource access request signal; and means cooperative with the allowing means for conveying the allowance to the associated user.

17. The apparatus of claim 15 wherein the means for commencing to issue a resource access request signal comprise:

means for monitoring the at least one request conductor at a first time to determine whether another user has a resource access request signal issued on a request conductor; and means responsive to the monitoring means for issuing on a request conductor at a second time delayed from the first time a resource access request signal, when the monitoring means have determined that no other user has a resource access request signal issued on a request conductor and the receiving means are receiving a request for resource access from the associated user.

18. The apparatus of claim 17 further comprising:

means for monitoring the grant conductor and for immediately allowing the associated user to access the resource upon detecting a resource access grant signal on the grant conductor while the issuing means are issuing a resource access request signal;

means cooperative with the allowing means for conveying the allowance to the associated user; and wherein the causing means comprise:

means for causing the issuing means to continue issuing the resource access request signal while the resource access grant signal detected by the means for allowing the associated user to access the resource continues to be detected.

19. Apparatus for interfacing a resource user to a resource in a processing system that includes a plurality of resource users, a resource shared by the plurality of resource users, a resource access request signal line shared by the plurality of users, a resource access grant signal line daisy-chained between the plurality of users, and an arbitrator for monitoring the busy status of the shared resource, the arbitrator coupled to the request line for receiving resource access request signals thereon, and coupled to the grant line for transmitting a resource access grant signal thereon after receiving a resource access request signal and detecting that the shared resource is not busy, the apparatus comprising:

means for receiving a request for resource access from the associated user;

first circuit means responsive to the receiving means for monitoring the request line at a first time to determine whether the request line is idle;

second circuit means responsive to the first circuit means at a subsequent second time for issuing a resource access request signal on the request line when the request line has been determined to be idle and the receiving means are receiving a request for resource access;

third circurt means for monitoring the grant line and responsive to the second circuit means for immediately allowing the associated user to access the resource in response to detecting a resource access grant signal incoming on the grant line while a resource access request signal is issued on the request line by the second circuit means;

means cooperative with the third circuit means for conveying the allowance to the associated user; and fourth circuit means for monitoring the grant line and cooperative with the third circuit means for blocking resource access grant signals responsed to by the third circuit means from propagating to other users.

20. The apparatus of claim 19 further comprising:

fifth circuit means cooperative with the second circuit means for forcing the second circuit means to continue issuing the resource access request signal until termination of detection at the interfacing apparatus of the resource access grant signal responded to by the third circuit means.

21. Method of controlling access to a shared resource by a plurality of resource users comprising the steps of:

(A) sensing a resource access request from a requesting user;

(B) in response to step (A) issuing a resource access request signal signal from the requesting user when request signals are not issued from other users;

(C) detecting a resource access request signal at an arbitrator;

(D) in response to step (C) generating a resource access grant signal when the resource may be accessed;

(E) detecting the resource access grant signal at a user;

(F) in response to step (E) immediately allowing the user to access the resource if a resource access request signal is being issued from the user;

(G) in response to step (E) continuing to generate the resource access request signal while the resource access grant signal continues to be detected at the user; and (H) in response to step (E) passing the grant signal on the another user if a resource access request signal is not being issued from the user.

22. In a processing system that includes a shared resource, a plurality of resource users coupled in parallel by a resource access request signal line and coupled in a serial chain by a resource access grant signal line, and an arbitrator coupled to the request and grant lines, method of arbitrating access to the resource by the plurality of users comprising the steps of:

(A) sensing a request for access to the resource by a user at an interface between the user and the request line;

(B) in response to step (A) determining at the interface at a first time whether a request signal from another user is present on the request line;

(C) issuing at the interface a request signal on the request line at a second time subsequent to the first time in response to determining absence of a request signal on the request line;

(D) detecting at the arbitrator a request signal on the request line;

(E) determining at the arbitrator whether access to the resource may be granted to a user;

(F) generating at the arbitrator a grant signal on the grant line upon determining that resource access may be granted and in response to detecting a request signal;

(G) detecting the grant signal on the grant line at an interface between an associated user and the request and grant lines;

(H) in response to step (G) immediately issuing a grant of access to the resource to the associated user at the request and grant line interface if a request signal is being generated at the request and grant line interface;

(I) in response to step (G) continuing to issue the request signal at the interface on the request line while the grant signal continues to be detected on the grant line at the interface; and (J) in response to step (G) passing on the detected grant signal on the grant line to the next user in the grant line chain if a request signal is not being generated at the request and grant line interface.

23. The method of claim 22 wherein the step (D) is preceded by the step of:

delaying detection at the arbitrator of a request signal present on the request line.

* * * * *

UNITED STATES PATENT AND TRADEMARK OFFICE
CERTIFICATE OF CORRECTION

PATENT NO. : 4,641,266
DATED : February 3, 1987
INVENTOR(S) : Patrick M. Walsh

It is certified that error appears in the above-identified patent and that said Letters Patent is hereby corrected as shown below:

Column 12, line 37, "cooperature" should be --cooperative--;
Column 12, line 60, "that" should be --other--;
Column 14, line 41, after "on", "the" should be --to--.

Signed and Sealed this

Twenty-third Day of June, 1992

Attest:

DOUGLAS B. COMER

*Attesting Officer*   Acting Commissioner of Patents and Trademarks